(12) United States Patent
Clover et al.

(10) Patent No.: US 8,672,127 B1
(45) Date of Patent: Mar. 18, 2014

(54) REMOTE CONTROL COVER

(71) Applicants: Robert Clover, Phoenix, AZ (US);
Deborah Clover, Phoenix, AZ (US)

(72) Inventors: Robert Clover, Phoenix, AZ (US);
Deborah Clover, Phoenix, AZ (US)

( * ) Notice: Subject to any disclaimer, the term of this patent is extended or adjusted under 35 U.S.C. 154(b) by 0 days.

(21) Appl. No.: 13/649,641

(22) Filed: Oct. 11, 2012

(51) Int. Cl.
*B65D 85/38* (2006.01)

(52) U.S. Cl.
USPC .......................................... 206/320; 206/305

(58) Field of Classification Search
USPC .................... 206/38, 305, 320; 383/84, 86
See application file for complete search history.

(56) References Cited

U.S. PATENT DOCUMENTS

| | | | | |
|---|---|---|---|---|
| 4,963,693 A * | 10/1990 | Kodl | | 206/305 |
| 5,092,459 A * | 3/1992 | Uljanic et al. | | 206/320 |
| 5,388,692 A * | 2/1995 | Withrow et al. | | 206/320 |
| 5,499,713 A * | 3/1996 | Huffer | | 206/320 |
| 5,812,188 A * | 9/1998 | Adair | | 206/320 |
| 5,873,456 A * | 2/1999 | Hull et al. | | 206/320 |
| 5,931,297 A * | 8/1999 | Weill et al. | | 206/320 |
| 6,471,056 B1 * | 10/2002 | Tzeng | | 206/320 |
| 6,772,881 B2 * | 8/2004 | Le et al. | | 206/305 |
| 2003/0127345 A1 * | 7/2003 | Zuleta et al. | | 206/320 |
| 2004/0016658 A1 * | 1/2004 | Le et al. | | 206/305 |

* cited by examiner

*Primary Examiner* — Luan K Bui
(74) *Attorney, Agent, or Firm* — Kenneth L Tolar

(57) ABSTRACT

A remote control cover includes a sleeve having a transparent front wall and an open bottom edge in communication with an interior chamber that houses a remote unit. The open bottom edge is selectively closed with a pair of releasable flaps that allow a user to easily install and remove the remote unit. The top edge includes a wide-profile aperture for exposing the remote unit's infrared transmitter. On the inner surface of the rear wall is a fabric pad for minimizing impact damage if the remote unit is dropped. Accordingly, when the remote unit is positioned within the interior chamber, the thin, transparent front wall allows a user to easily view and operate any of the remote unit's control buttons. Meanwhile, the sleeve protects the unit from contaminants and minimizes impact damage if the unit is dropped.

5 Claims, 2 Drawing Sheets

REMOTE CONTROL COVER

CROSS REFERENCE TO RELATED APPLICATIONS

This application is entitled to the benefit of provisional application No. 61/548,361 filed on Oct. 18, 2011, the specification of which is hereby incorporated by reference.

BACKGROUND OF THE INVENTION

The present invention relates to a protective cover for a remote control.

DESCRIPTION OF THE PRIOR ART

Remote units are widely used to control electronic devices, such as televisions, DVD players and cable or satellite converter boxes. Inevitably, the remote unit is exposed to spilled food, beverages or other debris, particularly in households with children. Not only can the internal electronics be damaged, but the control buttons may stick, rendering the remote unit inoperable until cleaned. Furthermore, remote units are constantly dropped, increasing the potential for impact damage.

Accordingly, there is currently a need for a device that protects a remote unit from contamination and impact damage. The present invention addresses this need by providing a padded, protective sleeve that encapsulates a remote unit to prevent damage thereto.

SUMMARY OF THE INVENTION

The present invention relates to a remote control cover comprising a sleeve having a transparent front wall and an open bottom edge in communication with an interior chamber that houses a remote unit. The open bottom edge is selectively closed with a pair of releasable flaps that allow a user to easily install and remove the remote unit. The top edge includes a wide-profile opening for exposing the remote unit's infrared transmitter. On the inner surface of the rear wall is a fabric pad for minimizing impact damage if the remote unit is dropped. Accordingly, when the remote unit is positioned within the interior chamber, the thin, transparent front wall allows a user to easily view and operate any of the remote unit's control buttons. Meanwhile, the sleeve protects the unit from contaminants and minimizes impact damage if the unit is dropped.

It is therefore an object of the present invention to provide a cover for protecting a remote control from contamination and impact damage.

It is another object of the present invention to provide a protective cover that allows control buttons on a remote unit to be fully accessible and functional.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
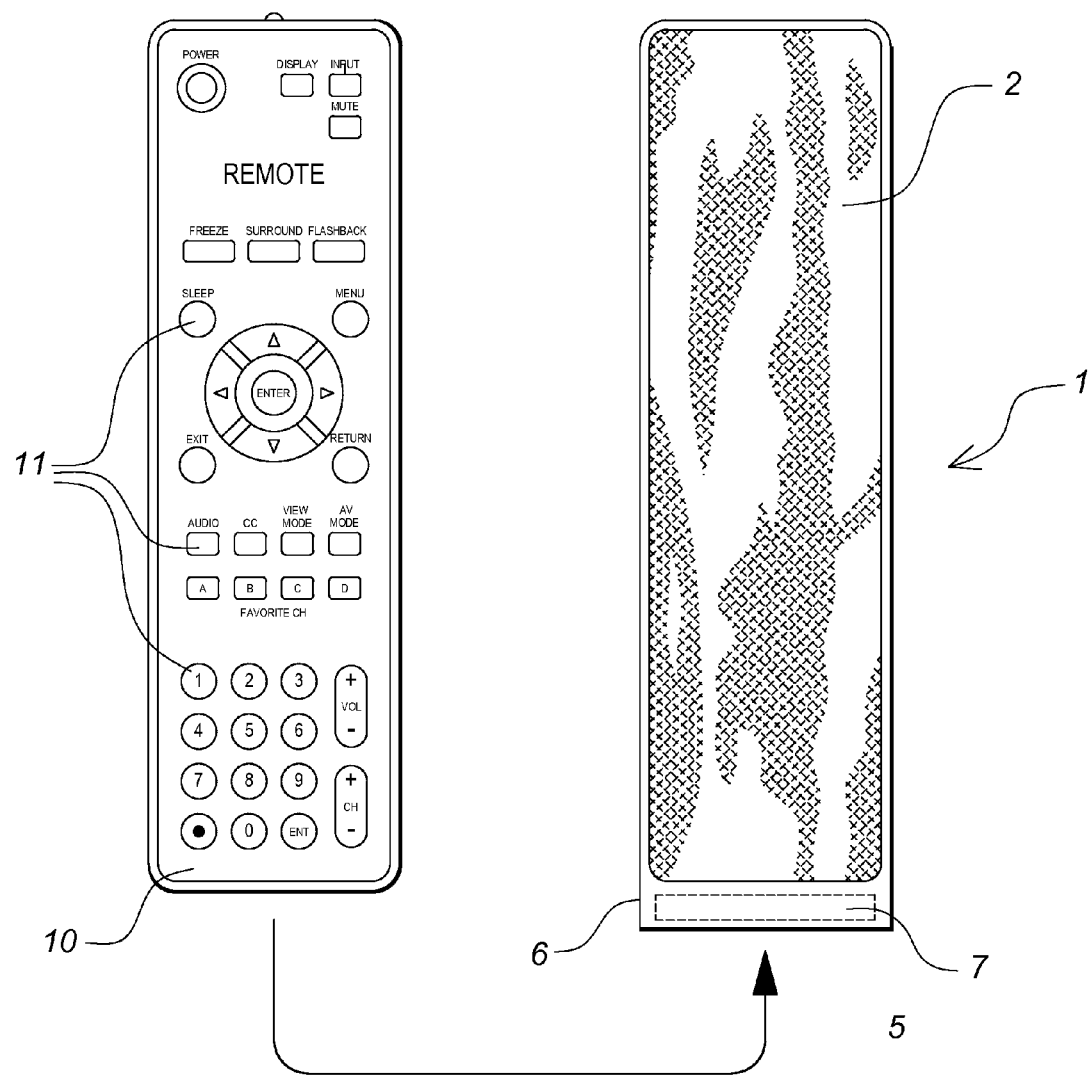
FIG. 1 is a front, plan view of an exemplary remote unit and the cover according to the present invention.
Figure 2:
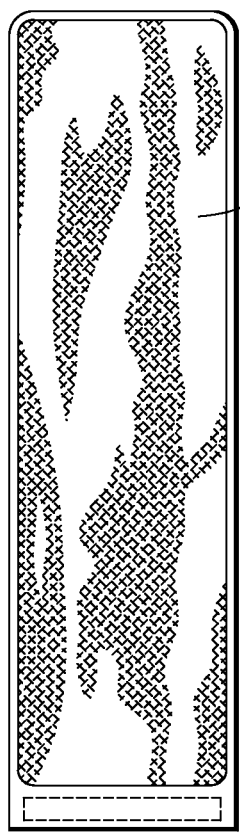
FIG. 2 is a front, isolated view of the cover.
Figure 3:
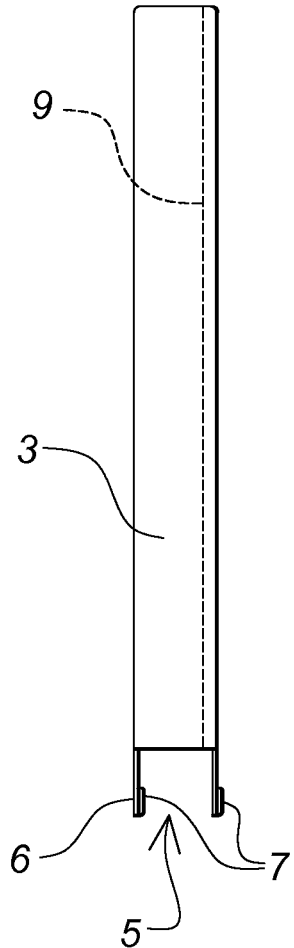
FIG. 3 is a side view of the cover.
Figure 4:
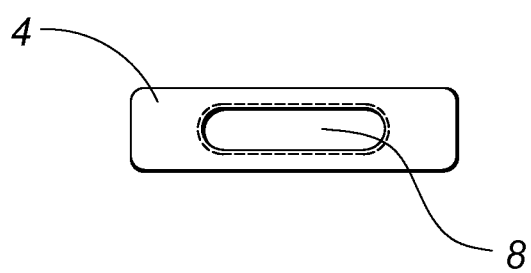
FIG. 4 is a top view of the cover.

The present invention relates to a remote control cover comprising a sleeve 1 having a rear wall, a transparent front wall 2, two sidewalls 3, a top edge 4 and an open bottom edge 5 in communication with an interior chamber that houses a remote unit 10. The front wall is constructed with a thin, polyurethane material that allows a user to view and depress control buttons 11 when the remote unit is received within the interior chamber. Preferably, the front wall is constructed with a military-grade polyurethane material similar to that used to construct covers for electronic keyboards that must be operated in deserts and other harsh environments. The remaining portion of the sleeve is preferably constructed with a decorative fabric, such as cotton or synthetic fiber.

The open bottom edge is selectively closed with a pair of flaps 6, each having a mating hook-and-loop fastener 7 thereon, to allow a user to easily install and remove the remote unit. The top edge includes a wide-profile aperture 8 for exposing the remote unit's infrared transmitter. Overlaying the entire inner surface of the rear wall is a fabric pad 9 for minimizing impact damage if the remote unit is dropped.

Accordingly, when the remote unit is positioned within the interior chamber, the thin, transparent front wall allows a user to easily view and operate any of the remote unit's control buttons. Meanwhile, the sleeve protects the unit from contaminants and minimizes impact damage if the unit is dropped.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a remote control having a housing with a top surface, said top surface having a plurality of control buttons thereon, a cover comprising:
    a sleeve having a rear wall, a thin transparent front wall and an opening in communication with an interior chamber, wherein said front wall is constructed with a thin, military-grade polyurethane material, and wherein the rear wall is constructed with a decorative fabric and includes an inner surface having a pad thereon for minimizing impact damage if the remote control is dropped, said chamber receiving said remote control with said transparent front wall overlaying said control buttons whereby said military-grade polyurethane material allows a user to view and depress said control buttons without removing the housing from said sleeve.

2. The remote control cover according to claim 1 wherein said opening is on a bottom edge of said sleeve for removing and inserting the remote control.

3. The remote control cover according to claim 1 wherein said opening is selectively closed with a pair of flaps, each of said flaps having a mating fastener thereon.

4. The remote control cover according to claim 1 wherein said sleeve further includes a top edge having a wide-profile aperture thereon for exposing an infrared transmitter on said remote control.

5. The remote control cover according to claim 3 wherein said mating fastener is either of a hook fastener and a loop fastener.

* * * * *